United States Patent [19]

Grant et al.

[11] Patent Number: 4,980,622
[45] Date of Patent: Dec. 25, 1990

[54] ACTUATOR TWO-FAULT TOLERANCE APPARATUS

[75] Inventors: Ross M. Grant, Shelton; Joseph D. DeCarlo, Trumbull, both of Conn.

[73] Assignee: United Technologies Corporation, Hartford, Conn.

[21] Appl. No.: 237,811

[22] Filed: Aug. 29, 1988

[51] Int. Cl.$^5$ .............................................. H02P 1/00
[52] U.S. Cl. ..................................... 18/286; 318/290
[58] Field of Search .............. 318/282, 283, 286, 290, 318/256, 276, 277, 284, 285, 65, 278, 466, 467, 468; 361/29, 30

[56] References Cited

U.S. PATENT DOCUMENTS

| | | | |
|---|---|---|---|
| 2,912,822 | 11/1959 | Hooker | 60/39.09 |
| 3,997,826 | 12/1976 | Mayer | 318/739 |
| 4,070,607 | 1/1977 | Mitterer | 318/282 X |
| 4,134,052 | 1/1979 | Wanlars et al. | 318/282 |
| 4,445,075 | 4/1984 | Fry | 318/286 X |

OTHER PUBLICATIONS

Military Specification "Valves, Fuel Shutoff, Electric Motor Operated"-MIL-V-8608A Amendment 2, Nov. 9, 1966, Supersedes Amendment 1, Jun. 21, 1966.

*Primary Examiner*—William M. Shoop, Jr.
*Assistant Examiner*—A. Jonathan Wysocki
*Attorney, Agent, or Firm*—Richard H. Kosakowski

[57] ABSTRACT

Control apparatus having two-fault tolerance for two position, motor operated actuators includes electronic circuitry for disconnection of the power return to the actuator motor armature thereby insuring that the motor will not be activated upon an inadvertent connection of power to either motor power input, and for indication of disconnection thereto. Testing determines the operatonal status of a motor relay and also determines inadvertent applications of power to the one of the pair of motor power inputs that is not connected to the power source through the position switch and one of the pair of limit switches. A relay and motor indication are operable to indicate either motor operation or inadvertent power interruptions in the one of the pair of motor power inputs most recently connected to the power source through the position switch and one of the pair of limit switches.

11 Claims, 1 Drawing Sheet

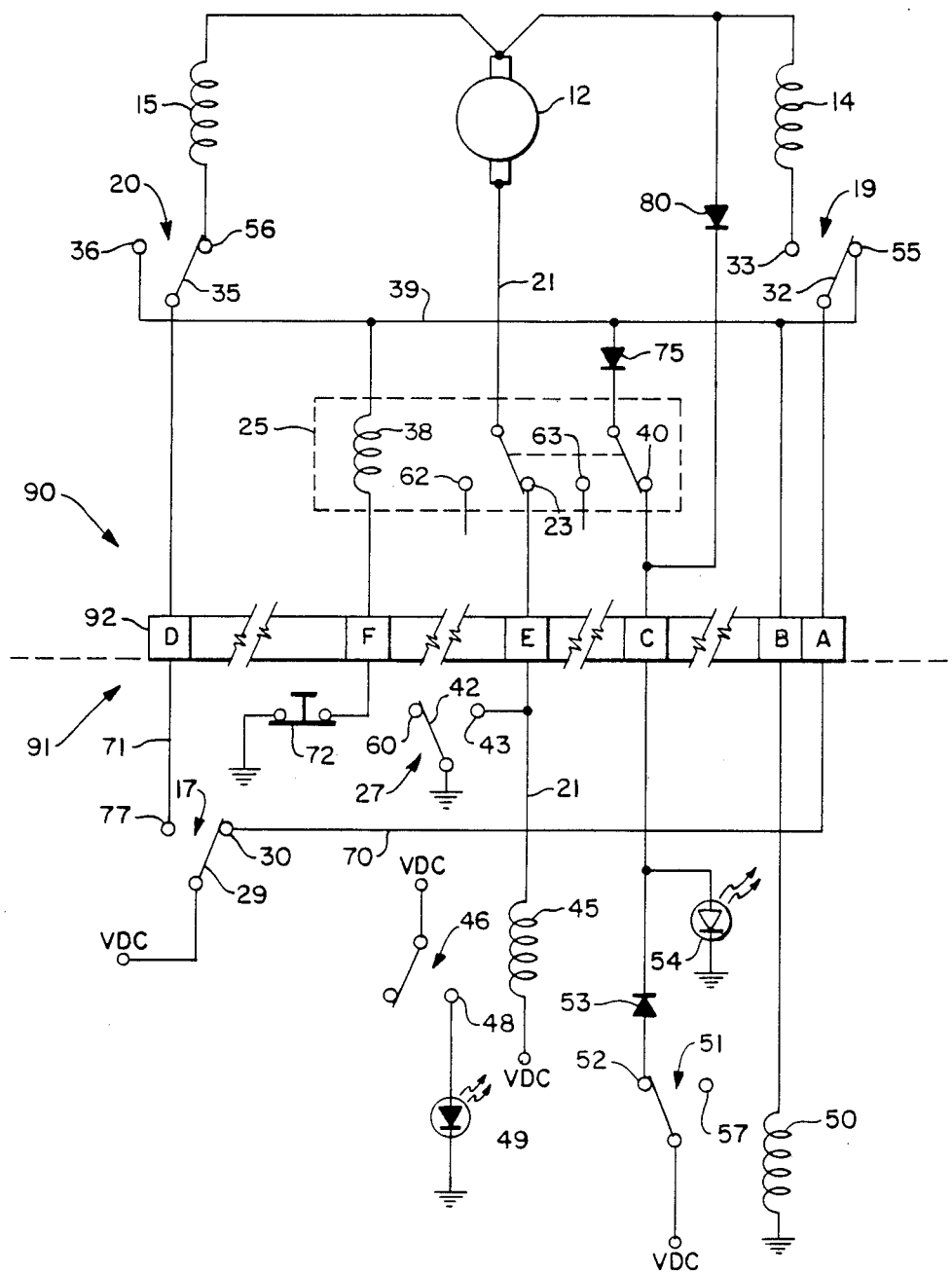

ACTUATOR TWO-FAULT TOLERANCE APPARATUS

This invention was made with Government support and the Government has certain rights in this invention.

TECHNICAL FIELD

This invention relates to actuators, and more particularly to apparatus for providing two-fault tolerance for two-position, motor operated actuators.

BACKGROUND ART

In the prior art of control apparatus for two position, motor operated actuators, it is known to use electronic circuitry to provide single fault safety. For example, for use with fuel shutoff valves operated by electric motors, Military Specification MIL-V-8608A, Amendment 2, specifies a valve electrical circuit that provides protection against inadvertent actuation of the valve motor due to electrical short circuits or electrical power failures. That is, upon the occurrence of a single fault such as an open circuit in one of the valve power inputs, or a short circuit of one of the valve power inputs to VDC, electronic circuitry is specified such that the valve remains in its last energized position. However, the subsequent occurrence of a second fault of a nature of those listed hereinbefore could cause the valve to assume the position other than that of the last energized position. In a representative application of a motor operated gate valve used in aircraft to gate fuel to the gas turbine engine propulsion system, the gate valve assuming a position other than that of the last energized position is unacceptable.

Two-fault tolerance can be achieved with existing MIL-V-8608A electronic circuitry by a parallel combination of two valves and two circuits. However, this is undesirable in that it adds undue weight and complexity to the overall valve system. Therefore, it is desirable to have a two position, motor operated valve that remains in its last energized position after the occurrence of two failures.

DISCLOSURE OF THE INVENTION

Objects of the present invention include providing a two position, motor operated actuator with two-fault tolerance control apparatus, and reducing the weight and complexity thereof.

According to the present invention, control apparatus having two-fault tolerance for two position, motor operated actuators includes electronic circuitry for disconnection of power return to the actuator motor armature circuit after the actuator has been commanded to either position, and for indication of disconnection thereto.

In further accord with the present invention, electronic circuitry is provided to detect and indicate the fact that relay contacts are operable to connect the power return to the actuator motor armature.

According to another aspect of the present invention, test means are provided to test the relay circuit that is operable to connect power return to the actuator motor armature.

Other objects, features and advantages of the present invention will become more apparent in the light of the following detailed description of exemplary embodiments thereof, as illustrated in accompanying drawings.

BRIEF DESCRIPTION OF THE DRAWINGS

The sole FIGURE herein is a schematic diagram of a circuit configuration of a two position, motor operated valve together with control circuitry for providing two-fault tolerance.

BEST MODE FOR CARRYING OUT THE INVENTION

Referring now to the FIGURE, a two position, motor operated, valve-type actuator is provided with control circuitry of the present invention for providing two-fault tolerance. A motor operated gate valve is comprised in part of an armature 12 and a pair of field coils 14,15. The motor is intended to be operated with a DC voltage from a power source in the range of +18 to +30 VDC across the series connection of the armature 12 and either of the field coils 14,15. The field coil 14 is disposed to open the valve, whereas the field coil 15 is disposed to close the valve. The application of VDC to either field coil 14,15 is controlled by a manually-operated position switch 17 together with a pair of limit switches 19,20. To complete the circuit of either field coil 14,15 and the armature 12, the power return (zero volts DC) is applied on a line 21 to the armature 12 through a normally closed contact 23 of the motor relay 25 and a manually-operated arming switch 27.

Operation of the valve is best understood by example. Assume the valve of the FIGURE is in a closed position and it is now desired to open the valve. The operator first positions the switch 17 such that arm 29 contacts switch contact 30. This is known as the valve opening position of the switch 17. The limit switch 19 will already be in a position where arm 32 contacts switch contact 33. Also, the limit switch 20 will be in a position where arm 35 contacts switch contact 36. When the limit switch 19 and the position switch 17 are in the abovementioned positions, a coil 38 of the motor relay 25 is deenergized because VDC is removed from a line 39. As a result of the coil 38 being deenergized, the normally closed contact 23 and a second normally closed contact 40 of the motor relay 25 are closed. In order to open the valve, the operator also must position the arming switch 27 such that arm 42 contacts switch contact 43. This is known as the armed position of the arming switch 27.

The arming switch 27 being in the armed position also switches zero volts DC (ground) on the line 21 to a coil 45 of a relay 46 to energize the coil 45. As a result, a normally open contact 48 of the relay 46 closes to pass electrical current from the power source to an arming indicator light 49. The arming indicator light 49, which can be a well-known LED (Light Emitting Diode), effectively indicates when the arming switch 27 is in the armed position.

Once the operator has positioned the two switches 17,27 in the aforementioned positions, the field coil 14 and the armature 12 are energized, the coil 38 of the motor relay 25 is deenergized, and the valve motor proceeds to drive the valve fully open. VDC being removed from the line 39 during the time the valve is opening causes a coil 50 of a relay 51 to be deenergized which closes a normally closed contact 52 of the relay 51 and forward biases a diode 53 to pass electrical current from the power source to a motor indicator light 54. The motor indicator light 54 can be a well-known LED. When the valve has reached its open position, the limit switch 19 positions itself such that the arm 32 contacts switch contact 55, and the limit switch 20 positions itself such that the arm 35 contacts switch contact 56. Thus, VDC is removed from the field coil 14 and connected to the line 39. Also, the diode 53 is no longer forward biased because the coil 50 of the relay 51 is energized thus closing a normally open contact 57 of the relay 51. Therefore, the motor indicator light 54 is turned off as well. At this time, the operator positions the arming switch 27 such that the arm 42 contacts switch contact 60. This is known as the disarmed position of the arming switch 27. Also, when the valve has reached the open position, the coil 38 of the motor relay 25 is energized thereby closing a pair of normally open contacts 62,63 of the motor relay 25. Since the two relays 25,51 are effectively energized and deenergized at the same time (i.e., the relay coils 38,50 are connected in a parallel electrical configuration), the relay 51 detects when the coil 38 of the motor relay 25 is deenergized, either due to a fault or a desired condition, such as a valve in-transit condition, and also provides means for illuminating the motor indicator light 54.

With the valve in the open position, assume a fault condition occurs in the nature of a power failure to one of the field coils. As an example, assume an open circuit exists on a line 70 to the valve opening field coil 14. The relay coils 38,50 become deenergized because the effect of an open circuit on the line 70 is such that VDC is removed from each of the relay coils 38,50. With the relay coil 38 deenergized, the normally closed contact 23 closes. However, assume the operator followed the procedure described previously whereby the arming switch 27 was placed in the disarmed position once it was determined by observation of the motor indicator light 54 turning off that the valve had reached the open position. Therefore, the arming switch 27 being in the disarmed position removes the possibility of zero volts DC being applied to the low side of the armature 12, thereby assuring that the armature 12 and either of the field coils 14,15 cannot be energized. Also, with an open circuit on the line 70, the relay coil 50 is deenergized, thereby illuminating the motor indicator light 54 to indicate a fault. Therefore, the ultimate result with the occurrence of the open circuit on the line 70 is that the valve has remained in the open position, i.e., the last energized position.

Now assume a second fault; subsequent to the first aforementioned fault, occurs whereby VDC is inadvertently supplied to the closing field coil 15 on a line 71 (i.e., a short circuit). Since the arm 35 of the limit switch 20 is in contact with the switch contact 56, VDC is applied to one side of the field coil 15. However, because the arming switch 27 is in the disarmed position, the armature 12 cannot be energized due to the unavailability of zero volts DC to the armature 12 on the line 21. Thus, upon the occurrence of the second fault, the valve continues to remain in the last energized (open) position. The motor indicator light 54 remains lit as a result of the first fault mentioned hereinbefore.

The control circuitry of the FIGURE also contains a test switch 72 to allow the operator to manually deenergize the coil 38 of the motor relay 25, thereby closing the normally closed contacts 23,40. Once the valve has completed its travel to either the open or closed position, the position of one of the limit switches 19,20 is such that the relay coil 38 is energized. When the operator opens the test switch 72, zero volts DC is removed from the low side of the coil 38. However, VDC remains on the high side of the coil 38 on the line 39 and is also connected to a diode 75. The diode 75 is thus forward biased to pass electrical current to the motor indicator light 54. The relay 51 is not affected by the operation of the switch 72 because the ground connection to the relay coil 50 is not switchable (i.e., it is hard wired). Therefore, the test switch 72 allows the operator to test the operation of the motor relay 25, the diode 75, and the motor indicator light 54.

Operation of the circuitry in closing the valve is now discussed. Assume the valve is in the open position, as described above, and no faults exist. The operator first positions the switch 17 such that the arm 29 contacts switch contact 77. This is known as the valve closing position of the switch 17. In this position, VDC is applied on the line 71 to the field coil 15. Also, the relay coils 38,50 are deenergized by removal of VDC from the line 39. The operator also moves the arming switch 27 to the armed position, which energizes the field coil 15 and the armature 12 to move the valve to the fully closed position The deenergization of the relay coil 50 illuminates the motor indicator light 54 to indicate that the valve motor is driving the valve to the fully closed position. When the valve reaches the closed position, the limit switch 20 positions the arm 35 to contact the switch contact 36, and the limit switch 19 positions the arm 32 to contact the switch contact 33. Also, the relay coils 38,50 will be energized, and the motor indicator light 54 will cease to be illuminated. When the operator sees the motor indicator light 54 turn off, he positions the arming switch 27 to the disarmed position. Then, if a fault occurs of the types listed hereinbefore (that is, a field coil power failure, exemplified by an open circuit in either of the field coil lines 70,71, or a short circuit to VDC of the field coil line that is the opposite of the field coil line most recently energized, exemplified by the shorting to VDC of the opening field coil line 70 with the valve in the closed position) the valve will remain in its last (closed) energized position.

Upon the occurrence of a fault of one of the aforementioned types, the motor indicator light 54 will either illuminate or not. If the motor indicator light 54 is illuminated and there is no valve motion, then a fault has occurred However, if the motor indicator light 54 is not illuminated and there is no valve motion, the operator must determine if a fault exists by other means. For example, assume the valve is in the open position and the only fault that has occurred subsequent to the valve reaching the open position is that of a short circuit to VDC of the line 71. Upon the occurrence of this fault, the motor indicator light 54 will not be illuminated because the relay coils 38,50 remain energized. The operator can determine if the fault exists by simultaneously opening the test switch 72 and positioning the arming switch 27 in the armed position. This connects zero volts DC to the armature 12. Then, if the motor moves the valve to the closed position, the short circuit of the line 71 to VDC has been diagnosed. Since the above procedure necessarily involves valve motion from the open to the closed position, this procedure is best performed at a time when valve motion is not critical (e.g., during pre-flight or post-flight). However, a diode 80, similar to one specified in MIL-V-8608A, would be forward biased to illuminate the indicator light 54 upon the occurrence of the short circuit of the line 71 to VDC. Thus, the aforementioned procedure would not be performed with a MIL-V-8608A valve circuit.

As a second example, assume the valve is in the open position and the only fault that has occurred subsequent to the valve reaching the open position is that of an open circuit of the line 71. Upon the occurrence of this fault, the motor indicator light 54 will not be illuminated because the relay coils 38,50 remain energized. The operator can determine if the fault exists by simultaneously positioning the arming switch 27 in the armed position and positioning the switch 17 in the valve closing position. Then if the valve remains in the open position, the abovementioned fault has been diagnosed.

As shown, the invention is implemented for use on rotorcraft whereby the valve is used to gate fuel to the gas propulsion system. The valve for use with the present invention is a two position valve; that is, it operates either fully open or fully closed. As shown in the FIGURE, the valve motor together with a portion of the aforementioned control circuitry resides in the vicinity of the rotorcraft gas propulsion system 90, while the remainder of the control circuitry is shown in the rotorcraft cockpit 91. The electrical connection between the control circuitry in the two rotorcraft areas is at a connector strip 92. However, the control circuitry of the present invention is not constrained to rotorcraft applications. The present invention could be used in any electric motor, two position actuator application where it is desired to have two-fault tolerance. As shown, the switches 17,27,72 in the cockpit are manually-operated. However, these switches could be automatically controlled by a fuel governor or an industrial process. Also, indicator lights are disclosed for visual indication of apparatus states. However, other types of indication devices can be used, such as audio indicators. All of the foregoing changes and variations are irrelevant to the invention, it suffices that the actuator motor control circuitry have the ability to disconnect the voltage from one side of the armature, thereby insuring that the actuator motor will not be inadvertently commanded to an undesired position upon the occurrence of a combination of two short circuits and/or open circuits in the actuator motor field windings.

Although the invention has been shown and described with respect to exemplary embodiments thereof, is should be understood by those skilled in the art that the foregoing and various other changes, omissions and additions may be made therein and thereto, without departing from the spirit and scope of the invention.

We claim:

1. Apparatus for controlling a bidirectional motor-operated actuator, comprising:
   a power source having a return;
   an actuator-driving motor having a pair of power inputs and a power return input, power applied to either of said power inputs causing said motor to move in an actuator opening or actuator closing direction, respectively;
   a position switch connected to said power source selectively operable to either one of two positions to provide power to either one of said power inputs;
   a motor relay having a normally closed motor contact connected to said power return input, and having a coil;
   a pair of limit switches operable jointly in response to the position of said actuator, one operative when said actuator is other than fully open to connect the opening contact of said position switch to the opening one of said power inputs, the other operative when said actuator is other than fully closed to connect the closing contact of said position switch to the closing one of said power inputs, each operative when said actuator is fully closed or open, respectively, to connect the corresponding contact of said position switch to one side of said coil;
   means for connecting the second side of said coil to said power return, characterized by:
   an arming switch operable to selectively connect or disconnect said normally closed motor contact of said motor relay to said power return, whereby the operation of said arming switch when in said disconnect position is to disconnect said power return from said power return input of said actuator-driving motor thereby insuring that said actuator-driving motor will not be activated upon an inadvertent connection of either of said power inputs to said power source.

2. The apparatus of claim 1, further characterized by:
   said means for connecting said power return to said second side of said coil comprising a manually-operable, normally closed test switch for disconnecting said power return from said second side of said coil.

3. The apparatus of claim 1, wherein said arming switch is manually operated.

4. The apparatus of claim 1, further characterized by:
   arming indicating means for indicating the position of said arming switch; and
   a relay having a normally open contact operable to selectively connect or disconnect said power source to said arming indicating means in response to said arming switch being in said connect or disconnect positions, respectively.

5. The apparatus of claim 4, wherein said arming indicating means comprises means for visually indicating the position of said arming switch.

6. Apparatus for controlling a bidirectional motor-operated actuator, comprising:
   a power source having a return;
   an actuator-driving motor having a power return input connected to said power return and a pair of power inputs, power applied to either of said power inputs causing said motor to move in an actuator opening or actuator closing direction, respectively;
   a position switch connected to said power source selectively operable to either one of two positions to provide power to either one of said power inputs;
   a motor relay having a normally closed motor contact connected to said power return input, and having a coil;
   a pair of limit switches operable jointly in response to the position of said actuator, one operative when said actuator is other than fully open to connect the opening contact of said position switch to the opening one of said power inputs, the other operative when said actuator is other than fully closed to connect the closing contact of said position switch to the closing one of said power inputs, each operative when said actuator is fully closed or open, respectively, to connect the corresponding contact of said position switch to one side of said coil, characterized by:
   test means for disconnecting said power return from a second side of said coil, whereby said disconnecting of said power return will cause said actuator motor to drive said actuator in either direction in the event that power is inadvertently applied to the one of said power inputs not connected to said power source through one of said limit switches and said position switch.

7. The apparatus of claim 6, further characterized by:
motor indicating means for indicating apparatus fault conditions and actuator in transit conditions;
a normally closed indicator contact of said motor relay connected to said motor indicating means, whereby said indicator contact is operative to connect said motor indicating means to said one side of said coil of said motor relay when said test means disconnects said power return from said second side of said coil of said motor relay.

8. The apparatus of claim 6, wherein said test means comprises a manually-operated, normally closed switch.

9. Apparatus for controlling a bidirectional motor-operated actuator, comprising:
a power source having a return;
an actuator-driving motor having a power return input connected to said power return and a pair of power inputs, power applied to either of said inputs causing said motor to move in an actuator opening or actuator closing direction respectively;
a position switch connected to said power source selectively operable to either one of two positions to provide power to either one of said power inputs;
motor indicating means for indicating apparatus fault conditions and actuator in transit conditions;
a motor relay having a normally closed indicator contact connected to said motor indicating means, and having a coil, one side of said coil connected to said power return;
a pair of limit switches operable jointly in response to the position of said actuator, one operative when said actuator is other than fully open to connect the opening contact of said position switch to the opening one of said power inputs, the other operative when said actuator is other than fully closed to connect the closing contact of said position switch to the closing one of said power inputs, each operative when said actuator is fully closed or open, respectively, to connect the corresponding contact of said position switch to the other side of said coil and said motor contact of said motor relay, characterized by:
a relay having a coil connected between said other side of said coil of said motor relay and said power return, and having a normally closed contact operable to selectively connect or disconnect said power source to said indicating means, whereby the operation of said normally closed contact when in a connect position is to connect said power source to said indicating means upon actuator motor operation or in the event that power is interrupted to the one of said power inputs most recently connected to said power source through one of said limit switches and said position switch.

10. A method of testing apparatus for controlling a bidirectional motor-operated actuator, comprising:
a power source having a return;
an actuator-driving motor having a pair of power inputs and a power return input, power applied to either of the power inputs causing said motor to move in an actuator opening or actuator closing direction, respectively;
a position switch connected to said power source selectively operable to either one of two positions to provide power to either one of said power inputs;
a motor relay having a normally closed motor contact connected to the power return input, and having a coil;
a pair of limit switches operable jointly in response to the position of the actuator, one operative when the actuator is other than fully open to connect the opening contact of the position switch to the opening one of the power inputs, the other operative when the actuator is other than fully closed to connect the closing contact of the position switch to the closing one of the power inputs, each operative when the actuator is fully closed or open, respectively, to connect the corresponding contact of the position switch to one side of the coil;
an arming switch operable to selectively connect or disconnect said normally closed motor contact of the motor relay to the power return, whereby the operation of the arming switch when in the disconnect position is to disconnect the power return from the power return input of the motor thereby insuring that the motor will not be activated upon an inadvertent connection of either of the power inputs to the power source; and
a manually-operable, normally closed test switch for disconnecting the power return from the second side of the coil;
comprising the steps of:
positioning the arming switch in the connect position;
next, positioning the test switch to disconnect the power return from the second side of the coil, whereby the disconnecting of the power return will cause the motor to drive the actuator in either direction in the even that power is inadvertently applied to the one of the power inputs not connected to the power source through one of the limit switches and the position switch.

11. A method of testing apparatus for controlling a bidirectional motor-operated actuator, having:
a power source having a return;
an actuator-driving motor having a power return input connected to the power return and a pair of power inputs, power applied to either of the power inputs causing the motor to move in an actuator opening or actuator closing direction, respectively;
a position switch connected to the power source selectively operable to either one of two positions to provide power to either one of the power inputs;
a motor relay having a normally closed motor contact connected to the power return input, and having a coil;
a pair of limit switches operable jointly in response to the position of the actuator, one operative when the actuator is other than fully open to connect the opening contact of the position switch to the opening one of the power inputs, the other operative when the actuator is other than fully closed to connect the closing contact of the position switch to the closing one of the power inputs, each operative when the actuator is fully closed or open, respectively, to connect the corresponding contact of the position switch to one side of the coil;

test means for disconnecting the power return from a second side of the coil, whereby the disconnecting of the power return will cause the motor to drive the actuator in either reaction in the event that power is inadvertently applied to the one of the power inputs not connected to the power source through one of the limit switches and the position switch;

motor indicating means for indicating apparatus fault conditions and actuator in transit conditions; and a normally closed indicator contact of the motor relay connected to the motor indicating means, whereby the indicator contact is operative to connect the motor indicating means to the one said of the coil of the motor relay when the test means disconnects the power return from the second side of the coil of the motor relay;

comprising the steps of:

positioning the test means to disconnect the power return form the motor relay coil;

next, determining the operational status of the motor relay by inspection of the motor indicating means, whereby the motor indicating means is activated if the motor relay is operating correctly.

* * * * *

UNITED STATES PATENT AND TRADEMARK OFFICE
CERTIFICATE OF CORRECTION

PATENT NO. : 4,980,622

DATED : December 25, 1990

INVENTOR(S) : Ross M. Grant and Joseph D. DeCarlo

It is certified that error appears in the above-identified patent and that said Letters Patent is hereby corrected as shown below:

Column 7, line 64, change "comprising" to --having--.

Column 7, line 68, change "said" to --the--.

Column 8, line 3, change "said" to --the--.

Column 8, line 5, change "said" to --the--.

Column 8, line 22, change "said" to --the--.

Column 10, line 1, change "said" to --side--.

Signed and Sealed this

Ninth Day of June, 1992

*Attest:*

DOUGLAS B. COMER

*Attesting Officer*     *Acting Commissioner of Patents and Trademarks*